UNITED STATES PATENT OFFICE.

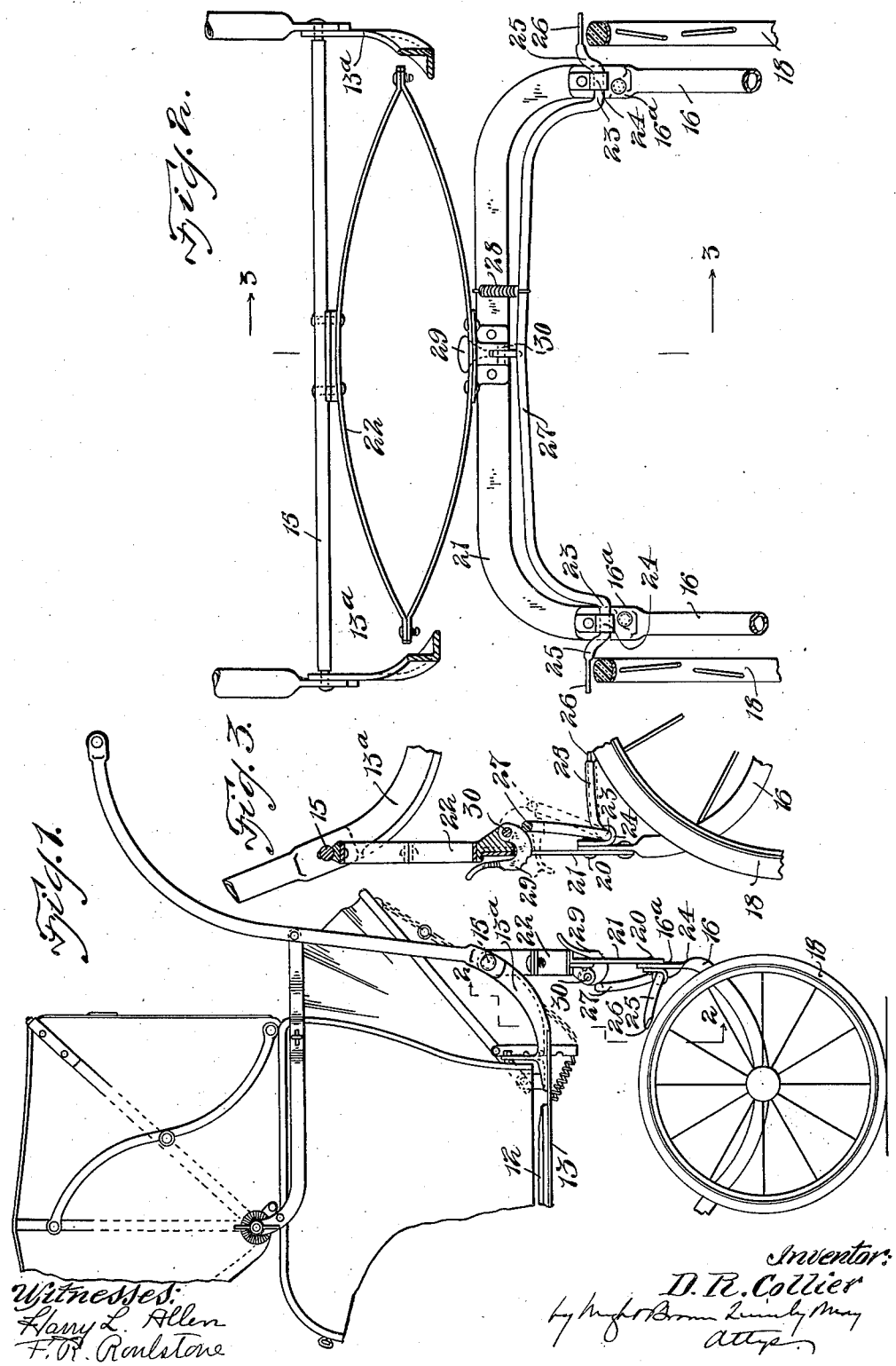

DAVID R. COLLIER, OF GARDNER, MASSACHUSETTS, ASSIGNOR TO COLLIER-KEYWORTH COMPANY, OF GARDNER, MASSACHUSETTS, A CORPORATION OF MASSACHUSETTS.

PERAMBULATOR.

1,026,735.  Specification of Letters Patent.  Patented May 21, 1912.

Original application filed December 23, 1910, Serial No. 599,037. Divided and this application filed July 27, 1911. Serial No. 640,952.

*To all whom it may concern:*

Be it known that I, DAVID R. COLLIER, a citizen of the United States, and a resident of Gardner, in the county of Worcester and State of Massachusetts, have invented certain new and useful Improvements in Perambulators, of which the following is a specification.

This invention, which is a division of my application for Letters Patent of the United States filed December 23, 1910, Serial No. 599,037, relates to children's carriages adapted to be folded compactly for transportation and storage and readily unfolded or made operative for use, the rear portion of the body of the carriage being supported over the running gear by an improved supporting structure including a spring and adapted to permit the ready folding and unfolding of the carriage.

The invention has for its object to provide an improved brake mechanism for preventing the rotation of the rear wheels, the construction of said brake mechanism being such that it is adapted to coöperate with the supporting means above mentioned.

The invention consists in the improvements which I will now proceed to describe and claim.

Of the accompanying drawings which form a part of this specification,—Figure 1 represents a side elevation of a portion of a perambulator embodying my invention. Fig. 2 represents a section on line 2—2 of Fig. 1, and an elevation of the parts at the right of said line. Fig. 3 represents a section on line 3—3 of Fig. 2.

Similar reference characters indicate the same or similar parts in all the figures.

The main frame of my improved perambulator which supports the seat 12 is composed of longitudinal side bars 13 to which the seat is attached, said seat constituting a connection between the side bars, and suitable transverse frame members behind and in front of the seat. To the rear ends of the side bars 13 are attached upwardly projecting ears 13ª connected by a cross bar 15 constituting the rear transverse frame member.

The running gear of the perambulator comprises wheel frames 16, each of which is preferably a length of tubing curved as shown by Fig. 1, and provided at its ends with upwardly projecting ears 16ª, only the ears at the rear end of the frame being here shown. The wheels 18 are mounted on axle arms attached to the depressed portions of the wheel frames, the construction of the running gear being practically the same as shown by Letters Patent of the United States, No. 929,560. The rear ends of the wheel frames are pivoted at 20 to the depressed ends of a transverse supporting member 21 said member having a raised central portion to which is attached the lower side of an elliptical spring 22, the upper side of which is attached to and supports the rear connecting member 15 of the main frame. The wheel frames and the wheels thereon are adapted to swing inwardly under the main frame, the rear wheels swinging between the depressed ends of the supporting member 21. Suitable means are provided, as shown by said Letters Patent No. 929,560 for locking the wheel frames in their upright position when the perambulator is in use. The depression of the ends of the transverse supporting member 21 enables the rear wheels to swing inwardly into close proximity with the main frame, similar provisions being made for permitting the front wheels to swing inwardly, as shown in the above-mentioned application, so that the main frame and the running gear may be reduced to a compact form for transportation and storage.

The spring 22 constitutes a yielding support for all parts of the body of the perambulator excepting the extreme front end, said spring being raised above the space into which the wheel frames swing when folded, so that it offers no obstruction to the folding of the wheel frames. The spring supports practically the entire weight of the occupant of the carriage and renders the motion of the carriage easy and comfortable.

For preventing the rotation of the rear wheels I provide a brake mechanism which includes a resilient brake rod comprising journal portions 23, 23 (Fig. 2) adapted to turn in bearings 24 on the depressed ends of the supporting member 21, arms 25 bent substantially at right angles with the journal portions 23, brake shoes 26 formed on the outer ends of the arms 25 and extending across the tires of the rear wheels, and a body portion 27 which connects and is offset from the journal portions 23 and extends substantially parallel with the transverse supporting member 21, as shown by Fig. 2, the said portion 27 constituting a lever arm adapted, when moved in one direction, to apply the brake shoes to the rear wheel tires, and when moved in the opposite direction to remove said brake shoes. The central portion 27 of the brake rod is raised and its end portions are depressed, so that the brake rod normally stands substantially parallel with the supporting member 21, as shown by Fig. 2, a space being provided under the raised portions of the supporting member and brake rod, and between the depressed end portions thereof, into which the wheel frames swing when the perambulator is folded.

28 represents a spring connecting the portion 27 of the brake rod with the supporting member 21, and adapted to yieldingly move the brake rod to remove the brake shoes from the tires and normally hold the brake rod in the position shown by Fig. 2.

29 represents a cam lever pivoted at 30 to ears affixed to the raised central portion of the supporting member 21, and so formed that, when moved to the position shown by dotted lines in Fig. 3, it will positively force the portion 27 of the brake rod in the direction required to apply the brake shoes. When the lever 29 is raised, as shown by full lines in Fig. 3, it permits the spring 28 to remove the brake shoes.

I claim:—

1. A perambulator comprising a main frame having a seat, a transverse supporting member connected with the main frame behind the seat and having a raised central portion and depressed ends, wheel frames pivoted at their rear ends to the depressed ends of the supporting member behind the seat, wheels mounted on said wheel frames, a transverse brake rod having a raised central portion and depressed end portions, the latter being extended to form journal portions adapted to turn in bearings on the depressed ends of the supporting member, angular arms, portions of which constitute brake shoes, projecting outwardly from said journal portions over the rear wheels, the central portion and depressed ends of the brake rod constituting a lever arm adapted to be moved to apply and remove the brake shoes, and being substantially parallel with the said supporting member so that the wheel frames may swing inwardly under it, means for positively moving said lever arm to apply the brake shoes, and means for yieldingly moving the lever arm to remove the brake shoes.

2. A perambulator comprising a main frame having a seat, a transverse supporting member connected with the main frame behind the seat and having a raised central portion and depressed ends, wheel frames pivoted at their rear ends to the depressed ends of the supporting member behind the seat, wheels mounted on said wheel frames, a transverse brake rod having a raised central portion and depressed end portions extending substantially parallel with the corresponding portions of the supporting member, the said end portions being extended to form journal portions adapted to turn in bearings on the depressed ends of the supporting member, angular arms, portions of which constitute brake shoes, projecting outwardly from said journal portions over the rear wheels, the central portion and depressed ends of the brake rod constituting a lever arm adapted to be moved to apply and remove the brake shoes, a cam lever pivoted to the raised central portion of the supporting member and adapted to positively move said lever arm in one direction to apply the brake shoes, and a spring adapted to yieldingly move the lever arm in the opposite direction to remove the brake shoes.

In testimony whereof I have affixed my signature, in presence of two witnesses.

DAVID R. COLLIER.

Witnesses:
 THATCHER B. DUNN,
 FLORENCE L. MOORE.

Copies of this patent may be obtained for five cents each, by addressing the "Commissioner of Patents, Washington, D. C."